(12) United States Patent
Slater

(10) Patent No.: US 12,372,405 B2
(45) Date of Patent: Jul. 29, 2025

(54) REFERENCE MATERIAL FOR AND METHOD OF CALIBRATING RAMAN SPECTROMETERS

(71) Applicant: Endress+Hauser Optical Analysis, Inc., Ann Arbor, MI (US)

(72) Inventor: Joseph Slater, Dexter, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 147 days.

(21) Appl. No.: 18/480,812

(22) Filed: Oct. 4, 2023

(65) Prior Publication Data
US 2025/0052614 A1 Feb. 13, 2025

Related U.S. Application Data

(63) Continuation-in-part of application No. 18/446,801, filed on Aug. 9, 2023.

(51) Int. Cl.
G01J 3/44 (2006.01)
(52) U.S. Cl.
CPC ..... *G01J 3/4406* (2013.01); *G01J 2003/4424* (2013.01)
(58) Field of Classification Search
CPC .... G01J 3/4406; G01J 2003/4424; G01J 3/28; G01J 3/44; G01N 21/65; G01N 33/588; A61B 5/0075
See application file for complete search history.

(56) References Cited

U.S. PATENT DOCUMENTS

| 10,473,581 | B2 | 11/2019 | Chow et al. | |
| 11,287,384 | B2 | 3/2022 | Norwood et al. | |
| 11,388,794 | B2 | 7/2022 | Jin | |
| 2004/0218649 | A1* | 11/2004 | Moerner | H01S 3/091 |
| | | | | 372/53 |
| 2017/0029697 | A1* | 2/2017 | Ghosh | C09K 11/025 |

* cited by examiner

*Primary Examiner* — Abdullahi Nur
(74) *Attorney, Agent, or Firm* — Gil M. Repa; Endress+Hauser (USA) Holding, Inc.

(57) ABSTRACT

A reference material for and a method of calibrating at least one Raman spectrometer are disclosed. The reference material includes quantum dots distributed in a transparent condensed phase material such that light emitted by the reference material in response to receiving excitation light having an excitation wavelength provided by the Raman spectrometer(s) has a predetermined spectral intensity distribution in a spectral measurement range of the Raman spectrometer(s). The method includes designing, manufacturing and providing the reference material, determining an emission spectrum of the reference material, and calibrating each Raman spectrometer by determining a reference spectrum of the reference material and by adjusting a determination of spectral intensity values of intensity spectra performed by the Raman spectrometer based on the reference spectrum and the emission spectrum of the reference material.

18 Claims, 3 Drawing Sheets

REFERENCE MATERIAL FOR AND METHOD OF CALIBRATING RAMAN SPECTROMETERS

CROSS-REFERENCE TO RELATED APPLICATIONS

The present application is a continuation-in-part of U.S. patent application Ser. No. 18/446,801, filed Aug. 9, 2023, the entire content of which is incorporated herein by reference.

TECHNICAL FIELD

The present disclosure relates to a reference material for calibrating a Raman spectrometer and a method of calibrating at least one Raman spectrometer using the reference material.

BACKGROUND

Raman spectrometers are currently employed in a large variety of different applications, including industrial applications and laboratory applications, to determine and to provide measurement results of various measurands of a medium. As an example, Raman spectrometers are, e.g., employed to determine concentrations of components included in the medium, a pH-value of the medium, a melt index of the medium and/or a cell motility of the medium.

Raman spectroscopy is a technique used to measure the wavelength and intensity of inelastically scattered radiation (e.g., light) from a sample, thereby revealing chemical and structural compositions of the sample. Raman spectroscopy is based on the principle that monochromatic excitation light will be reflected, absorbed, or scattered as a function of the particular molecule (e.g., protein, peptide, carbohydrate, cytokine, salt, etc.) that receives the incident radiation. Most of the energy is scattered at the same wavelength of the excitation light, referred to as elastic or Rayleigh scattering. A much, much smaller amount (e.g., ~0.001%) is scattered at different wavelengths (i.e., shifted), called inelastic or Raman scattering, the wavelengths of which are dependent on the molecular composition of the region sampled. In Raman spectroscopic analysis (interchangeably, Raman analysis and Raman spectroscopy), these wavelength shifts are captured in Raman spectra comprising the Raman scattered light (i.e., the Raman signal), which are analyzed to determine sample properties, including both chemical and physical properties.

Raman spectrometers commonly include a light source transmitting monochromatic excitation light to a sample of the medium and a spectrometric unit receiving Raman scattered light emanating from the sample and determining and providing measurement spectra of the Raman scattered light. The measurement spectra are, e.g., provided to an evaluation unit determining and providing measurement results of the respective measurand based on a previously determined model for determining the measurement results based on spectral intensities of the measurement spectra determined by the Raman spectrometer.

Different Raman spectrometers do, however, exhibit different spectral responsivities. As a result, the spectral shape and the spectral intensities of measurement spectra of identical samples determined by different Raman spectrometers may be different. In consequence, Raman spectrometers should be calibrated in a manner ensuring that the measurement spectra determined by the spectrometer correctly represent the spectral distribution of the received Raman scattered light.

Models used in Raman spectroscopy for determining measurement results of measurands can, for example, be determined based on measurements performed on samples exhibiting known values of the measurand and a detailed mathematical (e.g., statistical) analysis of the sample spectra determined and provided by these measurements. The determination of suitable models is, however, a laborious and time consuming process, in particular because of the complexity of interdependencies between spectral intensities of the sample spectra and the known values of the measurand, and/or because of influences of other properties of the medium that may affect the spectral intensities and/or the spectral distribution of the measurement spectra. Correspondingly, there is a desire to use the same model for determining measurement results of a measurand on multiple Raman spectrometers.

Reusing the same model on multiple Raman spectrometers requires for each of the Raman spectrometers to be calibrated in a manner ensuring each exhibits at least approximately identical spectral responsivities throughout their spectral measurement range. In other words, during calibration the different spectral responsivities of the Raman spectrometers have to be determined, and the determination of the spectral intensity values of the measurement spectra performed by the Raman spectrometers has to be adjusted in a manner ensuring the spectral intensity distribution of measurement spectra of identical samples determined by different Raman spectrometers are at least approximately identical.

The calibration of Raman spectrometers can, for example, be accomplished based on calibration measurements performed with the Raman spectrometers.

As an example, reference spectra of light emitted by a known and stable emission source, e.g., a black body radiator, may be determined with the Raman spectrometers to be calibrated. In this example, the reference spectra are, e.g., used to determine the spectral responsivity of the Raman spectrometers and to subsequently adjust the determination of the spectral intensity values of the measurement spectra performed by the respective Raman spectrometer based on the reference spectra and the known emission spectrum of the emission source.

A disadvantage of this method is, however, that anything which may alter the spectral balance of the light emitted by the emission source and its presentation to the spectrometric unit of the respective Raman spectrometer will contribute to a corresponding calibration error, e.g., a calibration error due to an incorrect determination of the spectral responsivity and/or an incorrect adjustment of the determination of the spectral intensity values. As an example, when a tungsten bulb is used as a black body radiator, variations of a drive current supplied to the tungsten bulb, as well as aging of a filament of the tungsten bulb, may alter the emissivity of the black body radiator. In addition, light propagation path(s) of light emitted by the black body radiator may deviate from the light propagation path(s) of light emanating from a sample of the medium during spectroscopic measurements of the measurand(s) performed with the respective Raman spectrometer. Thus, differences of the light propagation path(s) may also contribute to a corresponding calibration error.

As an alternative, calibration measurements may be performed on reference materials emitting known emission spectra in response to being illuminated by light having a predetermined excitation wavelength. In this case the reference materials are illuminated by the light sources of the Raman spectrometers to be calibrated and the adjustment of the determination of the spectral intensity values of the measurement spectra performed by the respective Raman spectrometer is performed based on the reference spectra of the reference material determined by the Raman spectrometer and the known emission spectrum of the reference material.

Reference materials suitable for this purpose, e.g., include standard reference materials (SRMs) developed for a number of different excitation wavelength by the National Institute of Standards and Technology (NIST) for relative intensity correction of Raman spectroscopic instruments. These standard reference materials include specific types of fluorescent glasses, which are available together with published emission spectra thereof.

Reference materials illuminated by the light source of the Raman spectrometer more truly account for the position of the sample and the corresponding light propagation path(s). A disadvantage of reference materials, such as fluorescent glasses, however, is that they are sensitive to temperature. In addition, quantum effects commonly referred to as "quenching" may reduce the intensity and may also alter the spectral balance of the emission spectra of theses reference materials. Due to the rather complex transitions occurring in reference materials, such as fluorescent glasses, the resulting emission spectra commonly exhibit an intensity profile including peaks and regions of low intensity. Steep sections of the intensity profile, as well as regions of very low intensity, make it difficult to accurately determine the spectral responsivity of Raman spectrometers within the affected spectral range and, correspondingly, also to correctly adjust the determination of the spectral intensity values of measurement spectra performed by these Raman spectrometers.

Certain improvements with respect to intensity calibrations performed based on reference spectra of these references materials may be achieved by a method for improving calibration transfer between multiple Raman analyzer installations disclosed in U.S. Pat. No. 11,287,384 B2. According to this method, a plurality of standard reference materials (SRMs) is provided and reference spectra for each SRM sample are generated under factory-controlled conditions using identical measurement instrumentation and measurement parameters. The method further includes calibrating an intensity axis of Raman spectrometers at multiple Raman analyzer installations based on calibration spectra of the SRM samples determined by the respective Raman spectrometer and the previously determined reference spectra of the SRM sample. U.S. Pat. No. 11,287,384 B2 also discloses a method of accounting for a temperature dependency of the emission spectra of these reference materials based on temperature measurements of the samples.

U.S. Pat. No. 10,473,581 B2 discloses a method of calibrating an imaging device, wherein the imaging device is illuminated by a multilayer light source including an ultraviolet light layer and a quantum dot layer. The ultraviolet light layer includes one or more LEDs generating ultraviolet light. The quantum dot layer absorbs ultraviolet light and generates radiation within the near infrared region at a selected intensity in response. During calibration, the imaging device receives the near infrared light at the selected intensity and a sensitivity of the imaging device is altered to detect the near infrared light at the selected intensity provided by the multilayer light source. In certain embodiments, the multilayer light source further includes a phosphor layer absorbing ultraviolet light and emitting visible light in response.

Even though the multilayer light source disclosed in U.S. Pat. No. 10,473,581 B2 may be well suited for calibrating imaging devices, it may not be well suited for calibrating Raman spectrometers. One reason is that light propagation path(s) of the light emitted by the multilayer light source may deviate from the light propagation path(s) of light emanating from samples during spectroscopic measurements performed with Raman spectrometers. As outlined above in context with the black body radiators, this deviation would contribute to a corresponding calibration error. Another reason is that the ultraviolet light may differ significantly from the monochromatic excitation light provided by the light source of the Raman spectrometer to be calibrated, in particular when the monochromatic light source is transmitting monochromatic visible or monochromatic near infrared light. Even though ultraviolet light emitted by the multilayer light source may occur outside the spectral measurement range of Raman spectrometers, including a monochromatic light source transmitting monochromatic visible or near infrared light, there is a risk the ultraviolet light may contribute to a calibration error. One reason is that materials or objects positioned alongside a transmission path of the ultraviolet may emit Raman scattered light and/or fluorescent light occurring within the spectral measurement range of Raman spectrometers in response to being illuminated by the ultraviolet light. A problem associated to the phosphor layer that may be included in the multilayer light source is that phosphor emissions may be very difficult to control, which in turn would make it very difficult or even impossible to correctly determine the spectral responsivity of a Raman spectrometer.

As illustrated in FIG. 5 of U.S. Pat. No. 10,473,581 B2, the emission spectrum provided by the multilayer light source exhibits multiple peaks in different spectral regions including a peak caused by the emissions of the quantum dot layer, as well as regions of low intensity. As explained above in context with the standard reference materials currently employed to calibrate Raman spectrometers, steep sections of intensity profiles and regions of very low intensity make accurately determining the spectral responsivity of Raman spectrometers within the affected spectral ranges difficult and, correspondingly, also correctly adjusting the determination of the spectral intensity values of measurement spectra performed by Raman spectrometers.

Accordingly, there remains a need for further contributions in this area of technology.

As an example, there is a need for a reference material and/or a calibration method that enables a more accurate determination of the spectral responsivity of Raman spectrometers and/or a more accurate adjustment of the determination of the spectral intensity values of measurement spectra performed by Raman spectrometers.

As a further example, there is a need for a reference material and/or a calibration method that reduces the adverse effect of temperature, quantum effects and/or other influences on the determination of the spectral responsivity of Raman spectrometers and/or the adjustments of the determination of the spectral intensity values of measurement spectra performed by Raman spectrometers.

SUMMARY

The present disclosure includes a method of calibrating at least one Raman spectrometer including a monochromatic light source configured to transmit excitation light having an excitation wavelength to a measurement region configured to accommodate a sample of a medium as to illuminate the sample, and a spectrometric unit configured to receive measurement light emanating from the illuminated sample and configured to determine and to provide intensity spectra of the received measurement light in a spectral measurement range. In at least one embodiment, the method comprises:

- providing a reference material comprising quantum dots distributed in a transparent condensed phase material such that light emitted by the reference material in response to the reference material receiving light having the excitation wavelength has a predetermined spectral intensity distribution in the spectral measurement range;
- determining an emission spectrum of the reference material in response to the excitation wavelength; and
- calibrating each Raman spectrometer by, using the respective Raman spectrometer, determining a reference spectrum of the reference material, and adjusting a determination of spectral intensity values of the intensity spectra performed by the respective Raman spectrometer based on the reference spectrum and the emission spectrum of the reference material.

Whereas emission spectra emitted by standard reference materials (SRMs), such as fluorescent glasses, are regularly a result of multiple complex transitions occurring in the glass, emission spectra of light emitted by quantum dots are due to simple and, in most cases, single transitions occurring in the quantum dots. This effect provides the advantage that the emission spectra of the reference materials of the present disclosure exhibit a significantly lower temperature dependency and are significantly less susceptible to other influences that may alter their spectral balance than fluorescent glasses. These advantages in turn enable a much more accurate determination of the spectral responsivities of Raman spectrometers to be calibrated over a much wider temperature range. Consequently, a more accurate and reliable adjustment of the determination of the spectral intensity values performed by the Raman spectrometers is achieved, which can be performed in a more repeatable manner on multiple Raman spectrometers. This repeatable accuracy in turn provides the advantage that models for determining measurement results of at least one measurand based on the spectral intensities of intensity spectra of samples of a medium can be used on multiple Raman spectrometers, which have each been calibrated according to the method of the present disclosure.

In addition or as an alternative, in certain embodiments, the transparent condensed phase material is:

- a liquid material, a solid material, an ionic solid, a salt, magnesium fluoride or a material including magnesium fluoride;
- a non-polarizable, non-fluorescent and/or non-phosphorescent material; and/or
- a material that does not emit any light in the spectral measurement range in response to being illuminated by light having the excitation wavelength, or a material selected such that an intensity of light emitted by the transparent condensed phase material in response to receiving light having the excitation wavelength is lower than a predetermined minimum intensity throughout the spectral measurement range.

In certain embodiments, the predetermined spectral intensity distribution is an at least approximately flat distribution and the emission spectrum of the reference material is an at least approximately flat emission spectrum.

In addition or as an alternative, in certain embodiments, the reference material is configured such that the spectral intensities of the emission spectrum occur:

- within a limited intensity range, or within a limited intensity range having a width smaller or equal to a given percentage, to a percentage of 10%, to a percentage of 5% or to a percentage of 1% of an intensity measurement range of the Raman spectrometer(s) to be calibrated throughout the spectral measurement range;
- are larger or equal to a predetermined minimum intensity throughout the spectral measurement range;
- occur within a limited, substantially central region of the intensity measurement range of the Raman spectrometer(s) to be calibrated; and/or
- occur within a limited, substantially central region of the intensity measurement range of the Raman spectrometer(s) to be calibrated including an intensity value corresponding to 50% of a maximum intensity of the intensity measurement range of the Raman spectrometer(s).

In certain embodiments, the excitation wavelength is a wavelength of 785 nm, a wavelength of 532 nm, a wavelength of 405 nm or another wavelength in the visible or near infrared wavelength range; and/or the spectral measurement range is given by a wavelength range or a wavenumber range corresponding to a wavenumber shift range of Raman scattered light induced by excitation light having the excitation wavelength, a wavenumber shift range of 4500 $cm^{-1}$ to 0 $cm^{-1}$, or a limited sub-range of a wavenumber shift range of 4500 $cm^{-1}$ to 0 $cm^{-1}$.

In an embodiment, the reference material includes an additional component exhibiting a distinct Raman band within the spectral measurement range, and the method includes, for at least two different temperatures of the reference material, determining an emission spectrum of light emitted by the reference material exhibiting the respective temperature in response to the reference material receiving excitation light having the excitation wavelength. In such an embodiment, for at least one of the Raman spectrometers, the method step of calibrating the respective Raman spectrometer includes determining a temperature of the reference material during determination the reference spectrum by performing a method of Raman thermometry based on the Raman band associated to the additional component included in the reference spectrum determined by the respective Raman spectrometer, and adjusting the determination of spectral intensity values of the intensity spectra performed by the respective Raman spectrometer based on the reference spectrum, the temperature of the reference material during determination the reference spectrum, and the previously determined emission spectra of the reference material.

In a further embodiment, wherein the reference material includes the additional component exhibiting a distinct Raman band within the spectral measurement range, for at least one of the Raman spectrometers, the method includes:

- determining a reference spectrum of the reference material at a time when the temperature of the reference material is known, measured by a temperature measurement device or controlled;
- based on this reference spectrum, determining a peak position of a Raman peak included in the reference spectrum that is associated to the Raman band exhibited by the additional component;
- based on the peak position of the Raman peak in the reference spectrum and a known or previously determined Raman wavenumber shift exhibited by the Raman peak of the additional component at the temperature of the reference material during determination of the reference spectrum, determining a measured excitation wavelength of the excitation light provided by the light source of the respective Raman spectrometer; and performing at least one of: a) providing the measured excitation wavelength; and b) performing a method step of: either b1) adjusting a spectral axis of the respective Raman spectrometer such that a spectral line associated to a wavenumber shift of 0 cm$^{-1}$ corresponds a wavenumber shift of 0 cm$^{-1}$ with respect to the measured excitation wavelength, or b2) based on the measured excitation wavelength, adjusting the excitation wavelength emitted by the light source of the respective Raman spectrometer.

The present disclosure further includes a reference material for calibrating at least one Raman spectrometer, the reference material comprising quantum dots distributed in a transparent condensed phase material such that an emission spectrum of light emitted by the reference material in response to the reference material receiving light having an excitation wavelength corresponding to an excitation wavelength of excitation light provided by a light source of the Raman spectrometer(s) to be calibrated has a predetermined spectral intensity distribution in a spectral measurement range of the Raman spectrometer(s) to be calibrated.

In certain embodiments of the reference material, the transparent condensed phase material is:

a liquid material, a solid material, an ionic solid, a salt, magnesium fluoride or a material including magnesium fluoride;

a non-polarizable, non-fluorescent and/or non-phosphorescent material; and/or a material that does not emit any light in the spectral measurement range in response to being illuminated by light having the excitation wavelength, or a material selected such that an intensity of light emitted by the condensed phase material in response to receiving light having the excitation wavelength is lower than a predetermined minimum intensity throughout the spectral measurement range.

In a further embodiment of the reference material, a composition, a size and a shape of the quantum dots included in the reference material is adapted and fabricated such that the emission spectrum of the reference material exhibits the predetermined spectral intensity distribution in the spectral measurement range.

In an embodiment of the reference material, the predetermined spectral intensity distribution is an at least approximately flat distribution and the emission spectrum of the reference material is an at least approximately flat emission spectrum.

In such an embodiment of the reference material, the spectral intensities of the emission spectrum: occur within a limited intensity range or within a limited intensity range having a width smaller or equal to a given percentage, to a percentage of 10%, to a percentage of 5% or to a percentage of 1% of an intensity measurement range of the Raman spectrometer(s) to be calibrated throughout the predetermined spectral measurement range; and/or are larger or equal to a predetermined minimum intensity throughout the predetermined spectral measurement range.

According to a further embodiment, the reference material further comprises an additional component exhibiting a distinct Raman band within the spectral measurement range.

In certain embodiments, the additional component is carbon, diamond, sapphire, silicon, calcium fluoride ($CaF_2$) or lithium niobate ($LiNbO_3$), and/or the additional component is included in the reference material in form of a powder distributed in the transparent condensed phase material or in form of a layer covering an exterior surface of the reference material.

In at least one embodiment according to the present disclosure, a method of manufacturing a reference material for calibrating at least one Raman spectrometer includes selecting one or more semiconductor materials of the quantum dots and determining a composition, a size and a shape of the quantum dots of the selected semiconductor material(s) such that the emission spectrum of the quantum dots distributed in the transparent condensed phase material exhibits the predetermined spectral intensity distribution in the desired spectral measurement range.

In a further embodiment, manufacturing the reference material includes fabricating the reference material by controlling the composition, the size and the shape of quantum dots of the selected semiconductor material(s).

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

The present disclosure includes a reference material RM for calibrating at least one Raman spectrometer 100 and a method of calibrating at least one Raman spectrometer 100 using the reference material RM.

Figure 1:
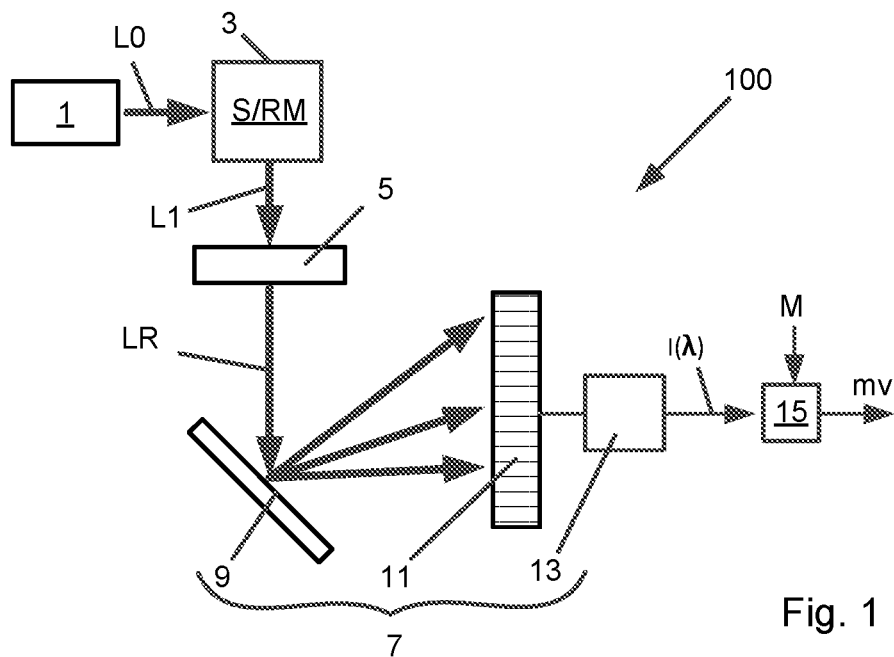
FIG. 1 shows a Raman spectrometer.

An example of a Raman spectrometer 100 according to the present disclosure is shown in FIG. 1. The Raman spectrometer 100 includes a monochromatic light source 1, e.g., a laser, configured to transmit excitation light L0 having an excitation wavelength $\lambda_0$ to a measurement region 3 configured to accommodate a sample S of a medium. In certain embodiments, the excitation wavelength $\lambda_0$ is, e.g., a wavelength in the visible or near infrared wavelengths range. As a non-limiting example, the excitation wavelength $\lambda_0$ is, e.g., a wavelength of 785 nm, of 532 nm, of 405 nm or another wavelength in the visible or near infrared wavelength range.

In certain embodiments, the Raman spectrometer 100 may include a filter 5, e.g., a notch-filter, configured to filter out measurement light LR included in light L1 emanating from the measurement region 3.

The Raman spectrometer 100 further includes a spectrometric unit 7 configured to receive measurement light LR emanating from the illuminated sample S and configured to determine and to provide intensity spectra I($\lambda$) of the measurement light LR in a spectral measurement range $\Delta\lambda$ of the Raman spectrometer 100.

In certain embodiments, the spectrometric unit 7 includes a disperser 9, e.g., a diffractive or holographic grating, configured to disperse the incident measurement light LR, a detector 11, e.g., an array of charge coupled devices (CCD) or an array of photodiodes, e.g., silicon photodiodes or avalanche photodiodes, configured to receive the dispersed measurement light LR, and a signal processor 13, e.g., a microprocessor, connected to the detector 11. The detector 11 is configured to determine and to provide detector signals corresponding to the spectral intensities of the incident dispersed measurement light LR. The signal processor 13 is configured to determine and to provide intensity spectra I($\lambda$) of the measurement light LR based on the detector signals.

The spectral measurement range $\Delta\lambda$ of the Raman spectrometer 100 is, e.g., a wavelength range or a wavenumber range corresponding to a wavenumber shift range of Raman scattered light induced by excitation light L0 having the excitation wavelength $\lambda_0$. As an example, in certain embodiments, the spectral measurement range $\Delta\lambda$ is, e.g., given by a range corresponding to a wavenumber shift range $\Delta k$ of 4500 $cm^{-1}$ to 0 $cm^{-1}$. As an alternative, the spectral measurement range $\Delta\lambda$ is, e.g., a limited range corresponding to a subrange of this wavenumber shift range that is of particular interest with respect to the measurand(s) to be measured with the Raman spectrometer 100.

In certain embodiments the Raman spectrometer 100 is, e.g., a Raman spectrometer 100 for measuring at least one measurand of a medium, e.g., for measuring a concentration of at least one component included in the medium, a pH-value of the medium, a melt index of the medium, a cell motility of the medium, and/or another property of the medium. During measurement of the measurand(s), a sample S of the medium is positioned in the measurement region 3 and illuminated by the light source 1. In this case, the measurement light LR is Raman scattered light emanating from the illuminated sample S, and the intensity spectra I($\lambda$) provided by the spectrometric unit 7 are Raman spectra of the sample S of the medium. The thus determined Raman spectra are, e.g., provided to an evaluation unit 15, which determines and provides measurement results mv of the measurand based on a previously determined model M for determining the measurement results mv based on spectral intensities of Raman spectra provided by the spectrometric unit 7. To this extent, the evaluation unit 15 is either an integral part of the Raman spectrometer 100 or an external unit configured to receive the intensity spectra I($\lambda$) determined by the spectrometric unit 7. In either case, the evaluation unit 15 is, e.g., connected to or in communication with the spectrometric unit 7.

To ensure a defined, accurate and reliable determination of the intensity spectra I($\lambda$) and/or the measurement results mv of the measurand(s), Raman spectrometers 100 should be calibrated. As illustrated in the flow chart shown in FIG. 2, the method according to the present disclosure for calibrating at least one Raman spectrometer 100 includes a method step A1 of, based on the excitation wavelength $\lambda_0$ of the excitation light L0 provided by the light source 1 of the Raman spectrometer(s) 100 to be calibrated and the spectral measurement range $\Delta\lambda$ of the Raman spectrometer(s) 100 to be calibrated, designing, manufacturing and providing a reference material RM for calibrating the Raman spectrometer(s) 100.

According to the present disclosure, the reference material RM comprises quantum dots distributed in a transparent condensed phase material, e.g., a transparent liquid material or a transparent solid material. The quantum dots distributed in the transparent condensed phase material are configured such that light emitted by the reference material RM in response to the reference material RM receiving excitation light having the excitation wavelength $\lambda_0$ has a predetermined spectral intensity distribution in the spectral measurement range $\Delta\lambda$ of the Raman spectrometer(s) 100 to be calibrated.

Quantum dots are nanometer scale semiconductor particles having optical and electronical properties that differ from those of larger particles due to quantum effects. Quantum dots provide the advantage that the wavelengths of fluorescent light emitted by quantum dots in response to a given excitation wavelength can be controlled by selecting the semiconductor material(s) of the quantum dots employed, by controlling the composition of the quantum dots, and by controlling the size and the shape of the quantum dots consisting of the selected semiconductor material(s). This enables for an emission spectrum E($\lambda$) of the reference material RM to be tailored as needed to attain the desired spectral intensity distribution in the spectral measurement range $\Delta\lambda$ during design of the reference material RM by varying the composition, size and shape of the quantum dots.

Thus, during design of the reference material RM, the quantum dots to be included in the reference material RM are, e.g., determined by selecting semiconductor material(s) for the quantum dots and by determining the composition, the size and the shape of the quantum dots of the selected semiconductor material(s) such that the emission spectrum E($\lambda$) emitted by the quantum dots distributed in the transparent condensed phase material in response to excitation light having the excitation wavelength $\lambda_0$ exhibits the predetermined spectral intensity distribution in the predetermined spectral measurement range $\Delta\lambda$. There are a variety of material systems from which quantum dots can be fabricated. In certain embodiments, the semiconductor material(s), e.g., include a group IV elemental semiconductor, group II-V semiconductor materials, group II-VI semiconductor materials, group IV-VI semiconductor materials, and/or related alloy systems, e.g., indium gallium alloy systems. In addition or as an alternative, quantum dots fabricated from multilayer structures, e.g., multilayer structures including cores and shells, e.g., cadmium selenide (CdSe) cores and zinc sulfide (ZnS) shells, may be used. Subsequently, the reference material RM is then fabricated and provided by controlling the composition, size and shape of the quantum dots included in the reference material RM accordingly.

The method further includes a method step A2 of determining the emission spectrum E($\lambda$) of the light emitted by the reference material RM in the spectral measurement range $\Delta\lambda$ in response to the reference material RM receiving excitation light having the excitation wavelength $\lambda_0$. The emission spectrum E($\lambda$) is, e.g., determined based on at least one intensity spectrum or based on multiple intensity spectra that have each been determined and provided by a spectroscopic measurement instrument illuminating the reference material RM with excitation light having the excitation wavelength $\lambda$ and determining and providing the intensity spectrum of the light emitted by the illuminated reference material RM in the spectral measurement range $\Delta\lambda$ in response.

The method further includes calibrating each Raman spectrometer 100 by performing a method step A3 of with the respective Raman spectrometer 100 determining a reference spectrum $I_{ref}(\lambda)$ of the reference material RM, and a method step A4 of adjusting the determination of the intensity spectra $I(\lambda)$ performed by the respective Raman spectrometer 100 based on the reference spectrum $I_{ref}(\lambda)$ and the emission spectrum $E(\lambda)$ of the reference material RM.

In method step A3, the determination of each reference spectrum $I_{ref}(\lambda)$ is, e.g., performed by: positioning the reference material RM in the measurement region 3 of the Raman spectrometer 100; with the light source 1, transmitting excitation light L0 having the excitation wavelength $\lambda_0$ to the reference material RM; and with the spectrometric unit 7, determining and providing the reference spectrum $I_{ref}(\lambda)$ of the measurement light LR emanating from the illuminated reference material RM in the spectral measurement range $\Delta\lambda$.

Figure 2:
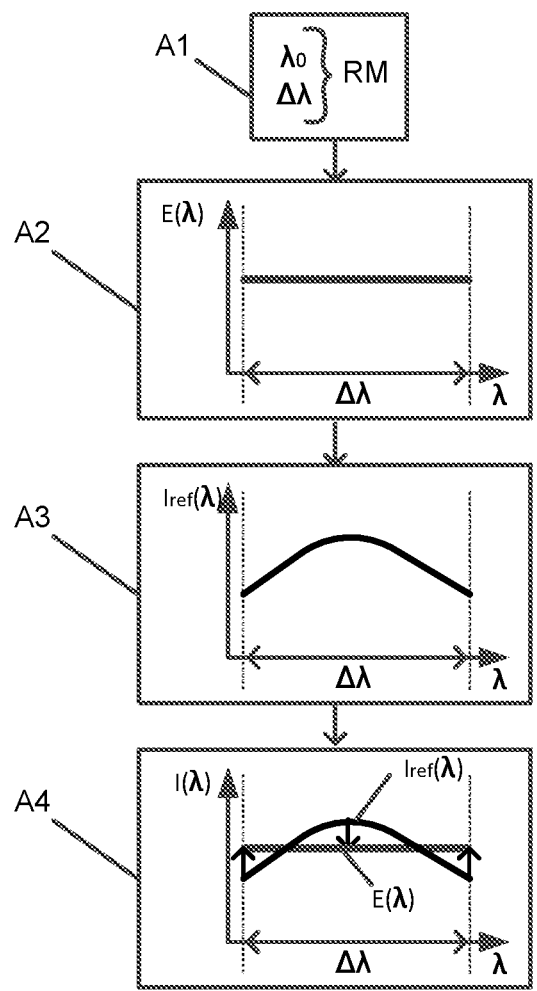
FIG. 2 shows a flow chart of a calibration method according to the present disclosure.

Adjusting the determination of the intensity spectra $I(\lambda)$ performed by the Raman spectrometer 100 is, e.g., performed as illustrated by arrows shown in method step A4 in FIG. 2 by determining and applying spectral correction terms, spectral correction factors or a spectral correction function for correcting the spectral intensity values determined by the Raman spectrometer 100 such that the corrected spectral intensity values of the reference spectrum $I_{ref}(\lambda)$ correspond to the spectral intensity values of the emission spectrum $E(\lambda)$.

The same reference material RM is, e.g., employed to calibrate multiple Raman spectrometers 100 including light sources 1 providing monochromatic light having the excitation wavelength $\lambda_0$ and spectrometric units 7 providing measured intensity spectra $I(\lambda)$ in the spectral measurement range $\Delta\lambda$.

When Raman spectrometers 100 including light sources 1 providing monochromatic light of a different excitation wavelength $\lambda_0$ are to be calibrated, reference materials RM designed, manufactured and configured as described above for the respective excitation wavelength $\lambda_0$ and the respective spectral measurement range $\Delta\lambda$ are, e.g., applied.

The method of the present disclosure enables the advantages mentioned above. Individual aspects of the method and/or the reference material(s) RM may be implemented in different ways without deviating from the scope of the present disclosure. Several optional embodiments are described in more detail below.

As an example, with respect to the reference material RM, different types of transparent condensed phase materials may be used. In certain embodiments, the transparent condensed phase material is, e.g., a material that does not emit any light in the spectral measurement range $\Delta\lambda$ in response to being illuminated by light having the excitation wavelength $\lambda_0$. As an alternative, the transparent condensed phase material is, e.g., a material selected such that an intensity of light emitted by the transparent condensed phase material in response to receiving light having the excitation wavelength $\lambda_0$ is lower than a predetermined minimum intensity throughout the spectral measurement range $\Delta\lambda$.

In certain embodiments, the condensed phase material is, e.g., a non-polarizable, non-fluorescent and/or non-phosphorescent liquid material or a non-polarizable, non-fluorescent and/or non-phosphorescent solid material.

Non-polarizable materials provide the advantage of being Raman neutral. This prevents Raman scattering in the transparent condensed phase material, which would otherwise lead to Raman peaks in the emission spectrum $E(\lambda)$ of the reference material RM.

Non-polarizability, non-fluorescence and non-phosphorescence of the condensed phase material each provide the advantage that corresponding emissions of the illuminated transparent condensed phase material are eliminated or at least negligibly low.

In certain embodiments, the transparent condensed phase material is, e.g., an ionic solid or a salt. As an example, the condensed phase material is, e.g., magnesium fluoride or a material including magnesium fluoride.

In each of these embodiments, the correspondingly low, negligible or even eliminated emissions of the transparent condensed phase material provide the advantage that the emission spectrum $E(\lambda)$ of the reference material RM is mainly or even solely due to emissions of the quantum dots and can, therefore, more easily and more accurately be tailored as needed based on the composition, size and shape of the quantum dots.

Figure 3:
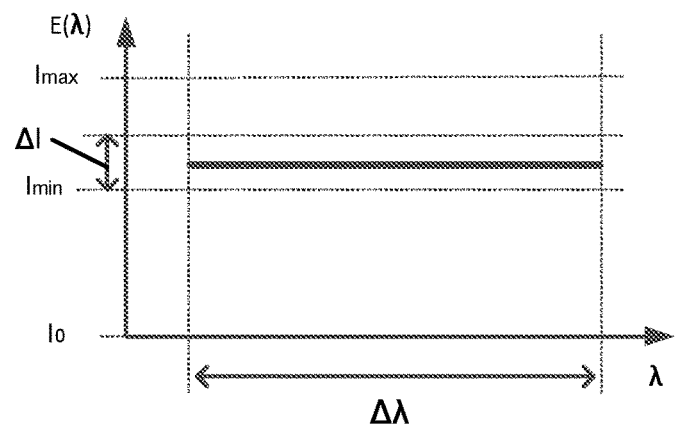
FIG. 3 shows an example of a flat emission spectrum of a reference material.

With respect to the emission spectrum $E(\lambda)$ of the reference material RM exhibiting the predetermined spectral intensity distribution in the spectral measurement range $\Delta\lambda$, various embodiments may be applied. As an example, in certain embodiments, the predetermined spectral intensity distribution is, e.g., an at least approximately flat distribution. In this case, the reference material RM is designed and configured to exhibit an at least approximately flat emission spectrum $E(\lambda)$. As illustrated in FIG. 3, showing an example of an at least approximately flat emission spectrum $E(\lambda)$, the reference material RM is, e.g., configured such that the spectral intensities of the emission spectrum $E(\lambda)$ occur within a limited intensity range $\Delta I$, e.g., a range having a width w smaller or equal to a given percentage X %, e.g., a percentage of 10%, of 5%, or of 1%, of an intensity measurement range $[I_{max}; I_0]$ of the Raman spectrometer(s) 100 to be calibrated throughout the entire measurement range $\Delta\lambda$. In this case, the range width w of the limited intensity range $\Delta I$ is given by $w := X\% * (I_{max} - I_0)$.

The flat emission spectrum $E(\lambda)$ of the reference material RM and the corresponding shape of the reference spectra $I_{ref}(\lambda)$ provides the advantage of enabling a more accurate determination of the spectral responsivity of the Raman spectrometer(s) 100 to be calibrated, as well as a more accurate adjustment of the determination of the intensity spectra performed by the Raman spectrometer(s) 100.

In addition or as an alternative, the reference material RM is, e.g., configured such that the spectral intensities values of the emission spectrum $E(\lambda)$ are larger or equal to a predetermined minimum intensity $I_{min}$ throughout the entire measurement range $\Delta\lambda$ and/or occur within a limited, substantially central region of the intensity measurement range $[I_{max}; I_0]$ of the Raman spectrometer(s) 100 to be calibrated, e.g., a center region including an intensity value corresponding to 50% of the maximum intensity $I_{max}$ of the intensity measurement range $[I_{max}; I_0]$ of the Raman spectrometer(s) 100. As an example, the reference material RM is, e.g., configured such that the spectral intensities values of the emission spectrum $E(\lambda)$ occur within a center region given by $0.5\, I_{max} +/- w/2$.

The spectral intensities of the emission spectrum $E(\lambda)$ exceeding the predetermined minimum intensity $I_{min}$ provides the advantage that the spectral intensities of the reference spectra $I_{ref}(\lambda)$ of the reference material RM determined by the Raman spectrometer(s) 100 to be calibrated all occur in an intensity range, wherein the measurement accuracy of the detector 11 is high. This again provides the advantage of a correspondingly accurate determination of the spectral responsivity of the Raman spectrometer(s) 100 to be calibrated, as well as a more accurate adjustment of the determination of the intensity spectra I(λ) performed by them.

The reference materials of the present disclosure are neither limited to reference materials RM exhibiting flat emission spectra E(λ) nor to reference materials RM exhibiting emission spectra E(λ) having spectral intensities occurring in a limited intensity range ΔI and/or exceeding a predetermined minimum intensity $I_{min}$. As an alternative, spectral distributions of a different shape and reference materials RM exhibiting correspondingly shaped emission spectra E(λ) may be employed.

Regardless of the shape of the spectral distribution, the reference materials RM disclosed herein provide the advantage that their emission spectra E(λ) exhibit a significantly lower temperature dependency than commonly employed materials, such as fluorescent glasses provided as standard reference materials (SRM) by the National Institute of Standards and Technology (NIST).

Thus, a single emission spectrum E(λ) determined at a given reference temperature of the reference material RM at least approximately correctly represents the emissions of the reference material RM in a much wider temperature range than a single emission spectrum of a fluorescent glass determined at the same reference temperature. Correspondingly, the calibration method disclosed herein provides the advantage that calibrations performed based on a single emission spectrum E(λ) of the reference material RM provide accurate calibration results in a wide variety of applications, wherein the temperature of the reference material RM occurs within this wide temperature range. In such embodiments, reference materials RM solely consisting of the quantum dots distributed in the transparent condensed phase material are employed, for example.

The present disclosure is however not limited to reference materials RM consisting of the quantum dots distributed in the transparent condensed phase material. In certain embodiments, the reference material RM' including the quantum dots distributed in the transparent condensed phase material may further include an additional component.

With respect to the additional component, materials enabling temperature compensated calibrations, as disclosed in U.S. patent application Ser. No. 18/446,801, filed Aug. 9, 2023 (the '801 application), in context with another type of calibration material may be employed. In this case, the additional component included in the reference material RM' is a component exhibiting a distinct Raman band within the spectral measurement range Δλ of the Raman spectrometer(s) 100 to be calibrated. In such embodiments, the additional component is, e.g., carbon, diamond, sapphire, silicon, calcium fluoride ($CaF_2$) or lithium niobate ($LiNbO_3$). In addition or as an alternative, the additional component is, e.g., provided in form of a powder distributed in the transparent condensed phase material or in form of a layer covering an exterior surface of the reference material RM'.

The additional component is preferably a component exhibiting only a single Raman peak within the spectral measurement range Δλ. In addition or as an alternative, the additional component is, e.g., a component exhibiting a narrow Raman peak, e.g., a Raman peak having a full width at half-maximum smaller or equal to a given percentage, e.g., 10% or even only 1%, of the width of the predetermined spectral measurement range 42.

Regardless of the type and/or the form of additional component employed, emission spectra $E_{Ti}'(\lambda)$ of the reference material RM' determined at different temperatures Ti of the refence material RM' each correspond to a superposition of the emission spectrum of the quantum dots distributed in the transparent condensed phase material exhibiting the predetermined spectral intensity distribution and Raman scattered light emitted by the additional component.

Figure 4:
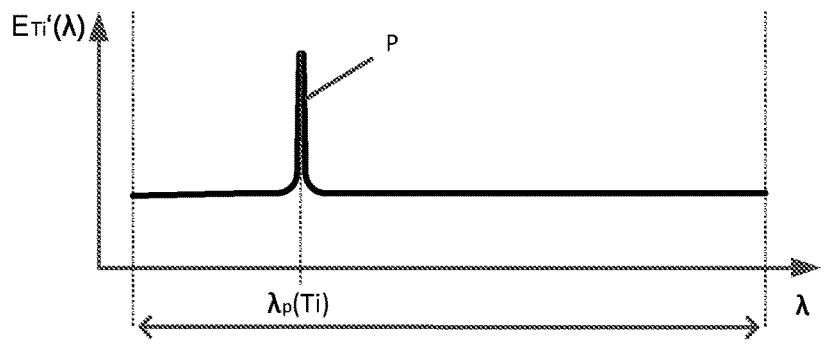
FIG. 4 shows an example of an emission spectrum of a reference material including an additional component according to the present disclosure.

This is illustrated in FIG. 4 showing an exemplary emission spectrum $E_{Ti}'(\lambda)$ of the reference material RM' determined at a temperature Ti of the reference material RM', wherein a Raman peak P associated to the Raman band exhibited by the additional material is superimposed on an emission spectrum of quantum dots distributed in a transparent condensed phase material exhibiting an at least approximately flat spectral intensity distribution.

In certain embodiments of the method according to the present disclosure, the Raman band exhibited by the additional component is employed to perform temperature compensated calibrations. In this respect, method steps of the temperature compensated calibrations disclosed in the '801 application may be used.

Figure 5:
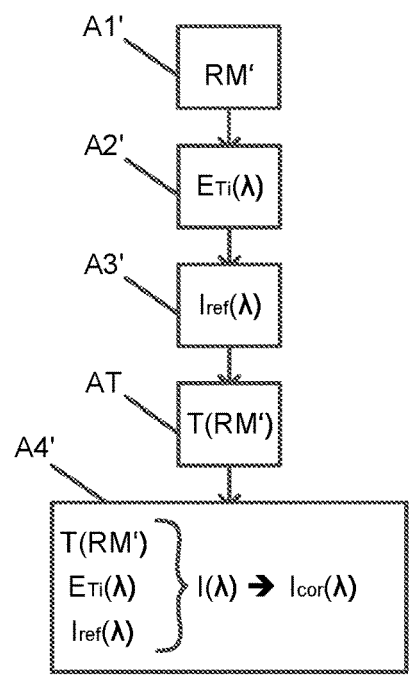
FIG. 5 shows a flow chart of a calibration method performed with a reference material including an additional component according to the present disclosure.

A flow chart of a corresponding embodiment of the calibration method according to the present disclosure is shown in FIG. 5. In this embodiment, the method includes the method step A1' of providing the reference material RM' comprising the quantum dots distributed in the transparent condensed phase material and the additional component, and a method step A2' of, for at least two different temperatures Ti, determining an emission spectrum $E_{Ti}(\lambda)$ of light emitted by the reference material RM' exhibiting the respective temperature Ti in response to the reference material RM' receiving excitation light having the excitation wavelength $\lambda_0$.

The method further includes for each Raman spectrometer 100 to be calibrated performing a method step A3' of with the Raman spectrometer 100 determining at least one reference spectrum $I_{ref}(\lambda)$ of the reference material RM'.

As shown in FIG. 5, in certain embodiments, the method further includes for at least one of the Raman spectrometers 100 to be calibrated performing a method step AT of, based on the Raman band included in the reference spectrum $I_{ref}(\lambda)$, determining the temperature T(RM') of the reference material RM' during determination the reference spectrum $I_{ref}(\lambda)$ by performing a method of Raman thermometry, and a method step A4' of adjusting the determination of spectral intensity values of the intensity spectra I(λ) performed by the respective Raman spectrometer 100 based on the reference spectrum $I_{ref}(\lambda)$, the temperature T(RM') of the reference material RM' during determination of the reference spectrum $I_{ref}(\lambda)$ and the previously determined emission spectra $E_{Ti}(\lambda)$ of the reference material RM'.

As disclosed in the '801 application, in method step AT, the temperature T(RM') is, e.g., determined based on a temperature dependent peak position of a Raman peak included in the reference spectrum $I_{ref}(\lambda)$ that is associated with the Raman band exhibited by the additional component. This method of Raman thermometry is particularly suitable with respect to Raman spectrometers 100 providing excitation light having a stable excitation wavelength $\lambda_0$, e.g., Raman spectrometers 100 including a gas laser or means to control the excitation wavelength $\lambda_0$.

As an alternative available for Raman spectrometers 100 capable of determining intensity spectra in a spectral range including spectral lines corresponding to wavelengths larger than the excitation wavelength $\lambda_0$ and spectral lines corresponding to wavelengths shorter than the excitation wavelength $\lambda_0$, the temperature T(RM') is, e.g., determined based on a temperature dependent ratio of the peak intensities of the Stokes Raman peak and on the corresponding anti-Stokes Raman peak included in the reference spectrum that are associated to the Raman band exhibited by the additional component.

Regardless of the method of Raman thermometry employed, the method step A4' of adjusting the determination of spectral intensity values performed by the respective Raman spectrometer 100, e.g., includes based on the emission spectra $E_{Ti}(\lambda)$ determining a reference emission spectrum exhibited by the reference material RM' at the temperature T(RM') that has been determined based on the reference spectrum $I_{ref}(\lambda)$. In this case, the adjustment, e.g., includes determining and applying spectral correction terms, spectral correction factors or a spectral correction function for correcting the spectral intensity values determined by the Raman spectrometer 100 such that the corrected spectral intensity values of the reference spectrum $I_{ref}(\lambda)$ correspond to the spectral intensity values of the reference spectrum throughout the spectral measurement range $\Delta\lambda$. Following the adjustment, intensity spectra $I(\lambda)$ determined and provided by the thus calibrated Raman spectrometer 100 are then given by correspondingly corrected intensity spectra $I_{cor}(\lambda)$.

Reference materials RM' including the additional component and temperature compensated calibrations performed with these reference materials RM' are, e.g., advantageous in applications, wherein the reference material RM' may exhibit extreme temperatures exceeding the wide temperature range, wherein a single emission spectrum $E(\lambda)$ of the reference materials RM determined at a given reference temperature of the reference material RM is sufficiently accurate.

In addition or as an alternative, the reference material RM' including the additional component described above may be used for at least one other purpose.

In certain embodiments for at least one of the Raman spectrometers 100, the method according to the present disclosure, e.g., includes a method step AWL of measuring the excitation wavelength $\lambda_0$ of the excitation light L0 provided by the light source 1 of the respective Raman spectrometer 100 and of determining a corresponding measured excitation wavelength $\lambda_m$.

Determining the measured excitation wavelength $\lambda_m$ is, e.g., advantageous with respect to Raman spectrometers 100 providing excitation light having a excitation wavelength $\lambda_0$, which may drift or vary depending on the conditions the excitation light source 1 is exposed to, e.g., Raman spectrometers 100 including a solid state laser.

Figure 6:
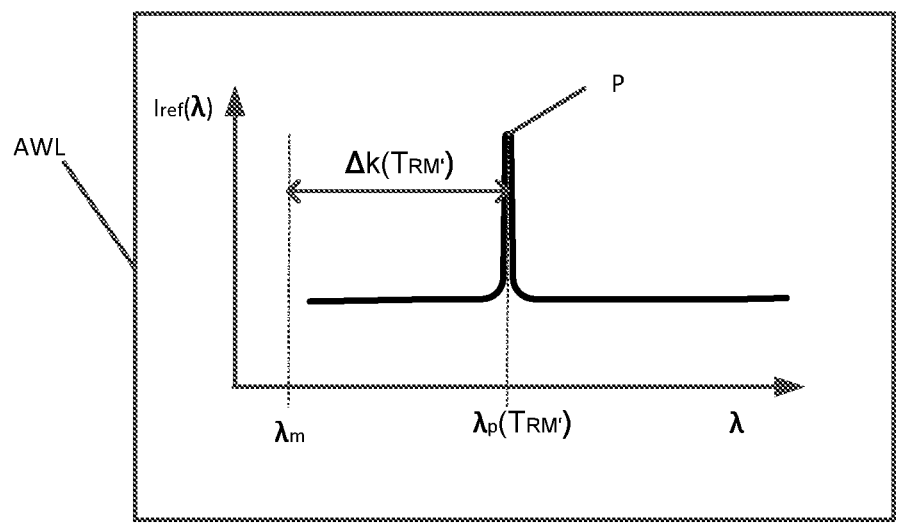
FIG. 6 shows a method step of determining an excitation wavelength based on a reference spectrum of a reference material including an additional component according to the present disclosure.

As illustrated in FIG. 6, method step AWL of determining the measured excitation wavelength $\lambda_m$ includes with the respective Raman spectrometer 100 determining a reference spectrum $I_{ref}(\lambda)$ of the reference material RM' at a time when the temperature T(RM') of the reference material RM' is known, e.g., because it is measured by a temperature measurement device or because it is controlled.

Method step AWL further includes, based on the reference spectrum $I_{ref}(\lambda)$, determining the peak position $\lambda p(T_{RM'})$ of the Raman peak P included in the reference spectrum $I_{ref}(\lambda)$ that is associated to the Raman band exhibited by the additional component. Next, the measured excitation wavelength $\lambda_m$ is then determined based on this peak position $\lambda p(T_{RM'})$ and on a known or previously determined Raman wavenumber shift $\Delta k(T_{RM'})$ exhibited by the Raman peak of the additional component at the temperature $T_{RM'}$ of the reference material RM' during determination of the reference spectrum $I_{ref}(\lambda)$.

Following the determination of the measured excitation wavelength $\lambda_m$, the measured excitation wavelength $\lambda_m$, is, e.g., provided.

In addition or as an alternative, a spectral axis of the respective Raman spectrometer 100 is, e.g., adjusted based on the measured excitation wavelength $\lambda_m$ such that the spectral line associated to a wavenumber shift of 0 cm$^{-1}$ corresponds a wavenumber shift of 0 cm$^{-1}$ with respect to the measured excitation wavelength $\lambda_m$. As an alternative to adjusting the spectral axis, the excitation wavelength $\lambda_0$ of the excitation light L0 emitted by the light source 1 of the respective Raman spectrometer 100 is, e.g., adjusted based on the measured excitation wavelength $\lambda_m$.

The invention claimed is:

1. A method of calibrating at least one Raman spectrometer, which comprises a monochromatic light source configured to transmit excitation light having an excitation wavelength to a measurement region configured to accommodate a sample of a medium as to illuminate the sample, and a spectrometric unit configured to receive measurement light emanating from the illuminated sample and configured to determine and provide intensity spectra of the received measurement light in a spectral measurement range, the method comprising:
   providing a reference material comprising quantum dots distributed in a transparent condensed phase material configured such that light emitted by the reference material in response to receiving light having the excitation wavelength has a predetermined spectral intensity distribution in the spectral measurement range;
   determining an emission spectrum of the reference material in response to the excitation wavelength; and
   calibrating each Raman spectrometer by:
      determining a reference spectrum of the reference material with the respective Raman spectrometer; and
      adjusting a determination of spectral intensity values of the intensity spectra performed by the respective Raman spectrometer based on the reference spectrum and the emission spectrum of the reference material.

2. The method according to claim 1, wherein the transparent condensed phase material is at least one of:
   a liquid material, a solid material, an ionic solid, a salt, magnesium fluoride, and a material including magnesium fluoride;
   a non-polarizable, non-fluorescent and/or non-phosphorescent material; and
   a material that does not emit any light in the spectral measurement range in response to being illuminated by light having the excitation wavelength, or that is selected such that an intensity of light emitted by the transparent condensed phase material in response to receiving light having the excitation wavelength is lower than a predetermined minimum intensity throughout the spectral measurement range.

3. The method according to claim 1, wherein the predetermined spectral intensity distribution is an at least approximately flat distribution and the emission spectrum of the reference material is an at least approximately flat emission spectrum.

4. The method according to claim 1, wherein the reference material is configured such that the spectral intensities of the emission spectrum, at least one of:
- occur within a limited intensity range or within a limited intensity range having a width smaller or equal to a given percentage of an intensity measurement range of the at least one Raman spectrometer to be calibrated throughout the spectral measurement range;
- are larger or equal to a predetermined minimum intensity throughout the spectral measurement range;
- occur within a limited, substantially central region of the intensity measurement range of the at least one Raman spectrometer to be calibrated; and
- occur within a limited, substantially central region of the intensity measurement range of the at least one Raman spectrometer to be calibrated including an intensity value corresponding to 50% of a maximum intensity of the intensity measurement range of the at least one Raman spectrometer.

5. The method according to claim 1, wherein the excitation wavelength is a wavelength of 785 nm, a wavelength of 532 nm, a wavelength of 405 nm, or another wavelength in the visible or near infrared wavelength range.

6. The method according to claim 1, wherein the spectral measurement range is given by a wavelength range or a wavenumber range corresponding to a wavenumber shift range of Raman scattered light induced by excitation light having the excitation wavelength, a wavenumber shift range of 4500 $cm^{-1}$ to 0 $cm^{-1}$, or a limited sub-range of a wavenumber shift range of 4500 $cm^{-1}$ to 0 $cm^{-1}$.

7. The method according to claim 1, wherein:
the reference material includes an additional component exhibiting a distinct Raman band within the spectral measurement range;
the method includes, for at least two different temperatures of the reference material, determining an emission spectrum of light emitted by the reference material exhibiting the respective temperature in response to the reference material receiving excitation light having the excitation wavelength; and
for the at least one Raman spectrometer, the method further comprises calibrating the respective Raman spectrometer, the calibrating comprising:
determining a temperature of the reference material during the determining of the reference spectrum by performing a method of Raman thermometry based on the Raman band associated with the additional component, which is included in the reference spectrum determined by the respective Raman spectrometer; and
adjusting the determination of spectral intensity values of the intensity spectra performed by the respective Raman spectrometer based on the reference spectrum, the temperature of the reference material during the determining of the reference spectrum, and the previously determined emission spectra of the reference material.

8. The method according to claim 1, wherein:
the reference material includes an additional component exhibiting a distinct Raman band within the spectral measurement range; and
for the at least one Raman spectrometer, the method further comprises:
determining a reference spectrum of the reference material at a time when the temperature of the reference material is known, either as measured by a temperature measurement device or as controlled;
based on this reference spectrum, determining a peak position of a Raman peak included in the reference spectrum, which peak position is associated with the Raman band exhibited by the additional component;
based on the peak position and on a known or previously determined Raman wavenumber shift exhibited by the Raman peak of the additional component at the temperature of the reference material during determination of the reference spectrum, determining a measured excitation wavelength of the excitation light provided by the light source of the respective Raman spectrometer; and
performing at least one of:
providing the measured excitation wavelength; and
adjusting either:
a spectral axis of the respective Raman spectrometer such that a spectral line associated to a wavenumber shift of 0 $cm^{-1}$ corresponds a wavenumber shift of 0 $cm^{-1}$ with respect to the measured excitation wavelength; or
based on the measured excitation wavelength, the excitation wavelength emitted by the light source of the respective Raman spectrometer.

9. A reference material for calibrating at least one Raman spectrometer, the reference material comprising quantum dots distributed in a transparent condensed phase material such that an emission spectrum of light emitted by the reference material in response to the reference material receiving light having an excitation wavelength corresponding to an excitation wavelength of excitation light generated by a light source of the at least one Raman spectrometer to be calibrated has a predetermined spectral intensity distribution in a spectral measurement range of the at least one Raman spectrometer to be calibrated.

10. The reference material according to claim 9, wherein the transparent condensed phase material is at least one of:
a liquid material, a solid material, an ionic solid, a salt, magnesium fluoride or a material including magnesium fluoride;
a non-polarizable, non-fluorescent and/or non-phosphorescent material; and
a material that does not emit any light in the spectral measurement range in response to being illuminated by light having the excitation wavelength, or that is selected such that an intensity of light emitted by the transparent condensed phase material in response to receiving light having the excitation wavelength is lower than a predetermined minimum intensity throughout the spectral measurement range.

11. The reference material according to claim 9, wherein a composition, a size and a shape of the quantum dots included in the reference material is designed and manufactured such that the emission spectrum of the reference material exhibits the predetermined spectral intensity distribution in the spectral measurement range.

12. The reference material according to claim 9, wherein the predetermined spectral intensity distribution is an at least approximately flat distribution and the emission spectrum of the reference material is an at least approximately flat emission spectrum.

13. The reference material according to claim 12, wherein the spectral intensities of the emission spectrum occur:
within a limited intensity range or within a limited intensity range having a width smaller or equal to a given percentage of an intensity measurement range of the at least one Raman spectrometer to be calibrated throughout the predetermined spectral measurement range; and/or are larger or equal to a predetermined minimum intensity throughout the predetermined spectral measurement range.

14. The reference material according to claim 13, wherein the given percentage is 10%, 5% or 1%.

15. The reference material according to claim 9, further comprising an additional component exhibiting a distinct Raman band within the spectral measurement range.

16. The reference material according to claim 15, wherein the additional component:

is carbon, diamond, sapphire, silicon, calcium fluoride ($CaF_2$) or lithium niobate ($LiNbO_3$); and/or is included in the reference material in form of a powder distributed in the transparent condensed phase material or in form of a layer covering an exterior surface of the reference material.

17. A method of manufacturing a reference material for calibrating at least one Raman spectrometer, which comprises a monochromatic light source configured to transmit excitation light having an excitation wavelength to a measurement region configured to accommodate a sample of a medium as to illuminate the sample, and a spectrometric unit configured to receive measurement light emanating from the illuminated sample and configured to determine and provide intensity spectra of the received measurement light in a spectral measurement range, the method comprising:

designing a reference material comprising quantum dots distributed in a transparent condensed phase material configured such that light emitted by the reference material in response to receiving light having the excitation wavelength has a predetermined spectral intensity distribution in the spectral measurement range, the designing comprising:

selecting at least one semiconductor material of the quantum dots; and determining a composition, a size and a shape of the quantum dots of the selected semiconductor material such that the emission spectrum of the quantum dots distributed in the transparent condensed phase material exhibits the predetermined spectral intensity distribution in the spectral measurement range.

18. The method of claim 17, further comprising fabricating the reference material by controlling the composition, the size and the shape of quantum dots of the selected at least one semiconductor material.

* * * * *